L. G. PEEL.

Seed Planter.

No. 25,041.

Patented Aug. 9, 1859.

Witnesses:

Inventor:
L. G. Peel.

UNITED STATES PATENT OFFICE.

LAWSON G. PEEL, OF WEBSTER COUNTY, GEORGIA.

IMPROVEMENT IN CORN-PLANTERS.

Specification forming part of Letters Patent No. 25,041, dated August 9, 1859.

*To all whom it may concern:*

Be it known that I, LAWSON G. PEEL, of the county of Webster and State of Georgia, have invented a new and Improved Machine for Planting Corn or Peas; and I do hereby declare that the following is an exact and full description thereof, reference being had to the accompanying drawings, in which—

Figure 1:
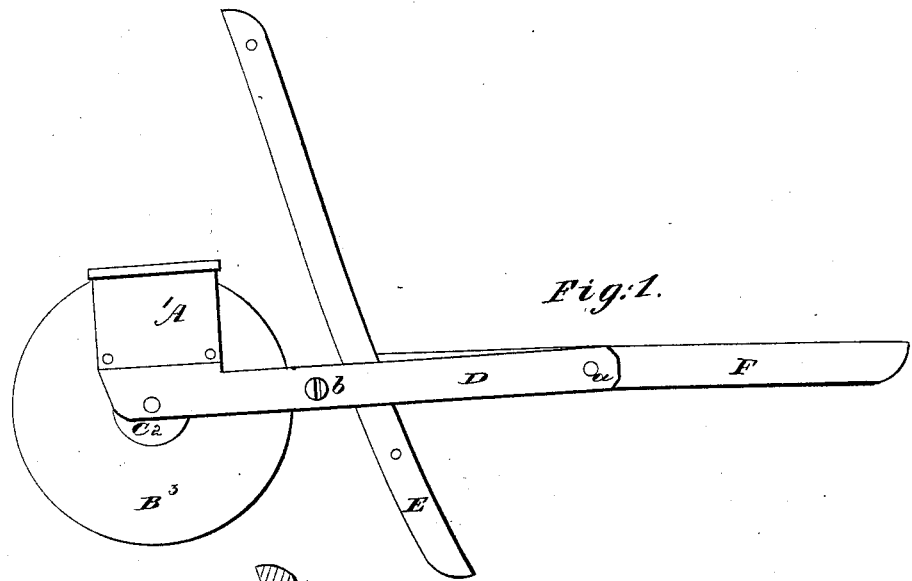
Figure 2:
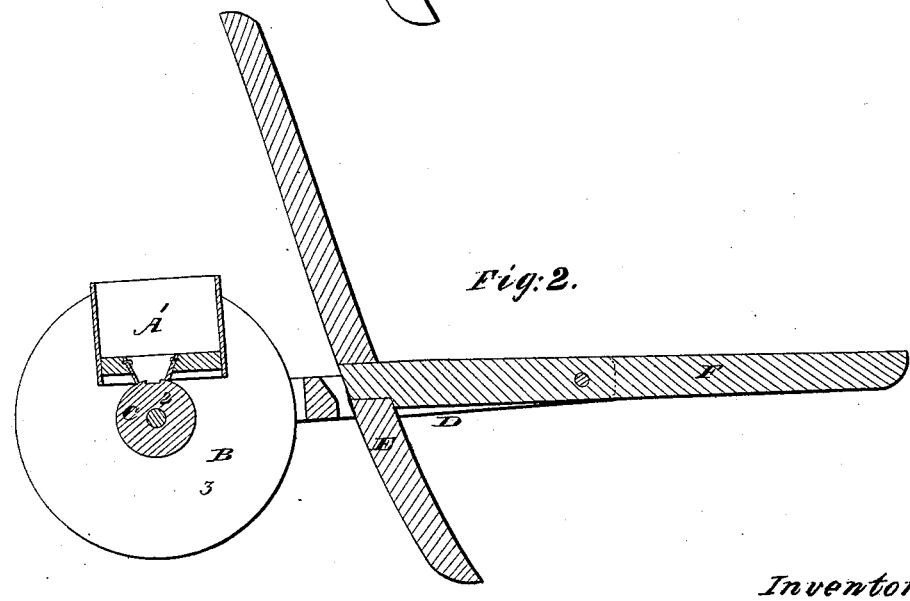

Figure 1 is an elevation of the machine. Fig. 2 is a longitudinal section through the center of Fig. 1.

A is the hopper. B is a wheel. C is a cylinder attached firmly to the shaft of wheel B. This cylinder revolves on the bottom of the hopper and contains a depression of capacity sufficient to supply seed to each hill, which it deposits in the furrows made by the plow at each revolution of wheel B. D is a frame composed of two side pieces. The side pieces, pivoted to the plow-beam at $a$ by a bolt, are sufficiently separated to allow the beam F and stock E to move up and down freely between them. Just behind the plow-stock a block of wood is secured between the side pieces by screws $b$, which serves to hold the frame D firmly in position. On the hind end of the frame the hopper A is secured, the shaft of the wheel C having its bearings in the side pieces directly below, as seen in the drawings.

The above machine is simple in construction, can be manufactured at small cost, and is easily kept in repair.

What I claim as my invention, and desire to secure by Letters Patent, is—

The arrangement of the beam F, stock E, frame D, bolt $a$, hopper A, wheel B, and cylinder C, as described, for the purposes set forth.

LAWSON G. PEEL.

Witnesses:
JESSE HARRELL,
GEO. M. HAY.